United States Patent [19]

Tanaka et al.

[11] Patent Number: 5,049,793
[45] Date of Patent: Sep. 17, 1991

[54] METHOD OF CONTROLLING V/F INVERTER FOR MACHINES HAVING MECHANICAL BRAKING SYSTEMS

[75] Inventors: Koji Tanaka, Yukuhashi; Kazunori Tsutusi, Kitakyushu, both of Japan

[73] Assignee: Kabushiki Kaisha Yasakawa Denki Seisakusho, Fukuoka, Japan

[21] Appl. No.: 348,101

[22] Filed: May 2, 1989

Related U.S. Application Data

[63] Continuation of Ser. No. 34,827, Apr. 6, 1987, abandoned.

[30] Foreign Application Priority Data

Apr. 10, 1986 [JP] Japan ................................. 61-83854

[51] Int. Cl.$^5$ .............................................. H02P 3/26
[52] U.S. Cl. ..................................... 318/436; 318/758
[58] Field of Search .............. 318/757, 758, 741, 742, 318/436, 430, 431, 371, 372, 798; 254/316, 322, 903; 187/115, 119

[56] References Cited

U.S. PATENT DOCUMENTS

| | | | |
|---|---|---|---|
| 3,331,003 | 7/1967 | King | 318/798 |
| 3,486,101 | 12/1969 | Rufli | 318/436 |
| 3,847,251 | 11/1974 | Maltby | 187/115 |
| 4,042,068 | 8/1977 | Ostrander et al. | 187/115 |
| 4,311,951 | 1/1982 | Walker et al. | 318/436 |
| 4,337,848 | 7/1982 | Kindler | 187/115 |
| 4,451,112 | 5/1984 | Hattori et al. | 318/798 |
| 4,456,868 | 6/1984 | Yamamura et al. | 318/806 |
| 4,479,565 | 10/1984 | Nomura | 187/119 |
| 4,503,937 | 3/1985 | Cervenec et al. | 187/119 |
| 4,651,073 | 3/1987 | Shimizu et al. | 318/758 |
| 4,681,191 | 7/1987 | Ikejima | 187/119 |

Primary Examiner—David Smith, Jr.
Attorney, Agent, or Firm—Jordan and Hamburg

[57] ABSTRACT

There is disclosed a method of controlling a voltage-to-frequency inverter which controls an induction motor by the use of an open-loop system. The motor drives a machine such as a crane, and is braked by a mechanical brake. When the machine is started or stopped, a low-frequency voltage is supplied to the motor so that the motor may produce a torque necessary to hold the load, until the actuation of the mechanical brake ends completely.

1 Claim, 4 Drawing Sheets

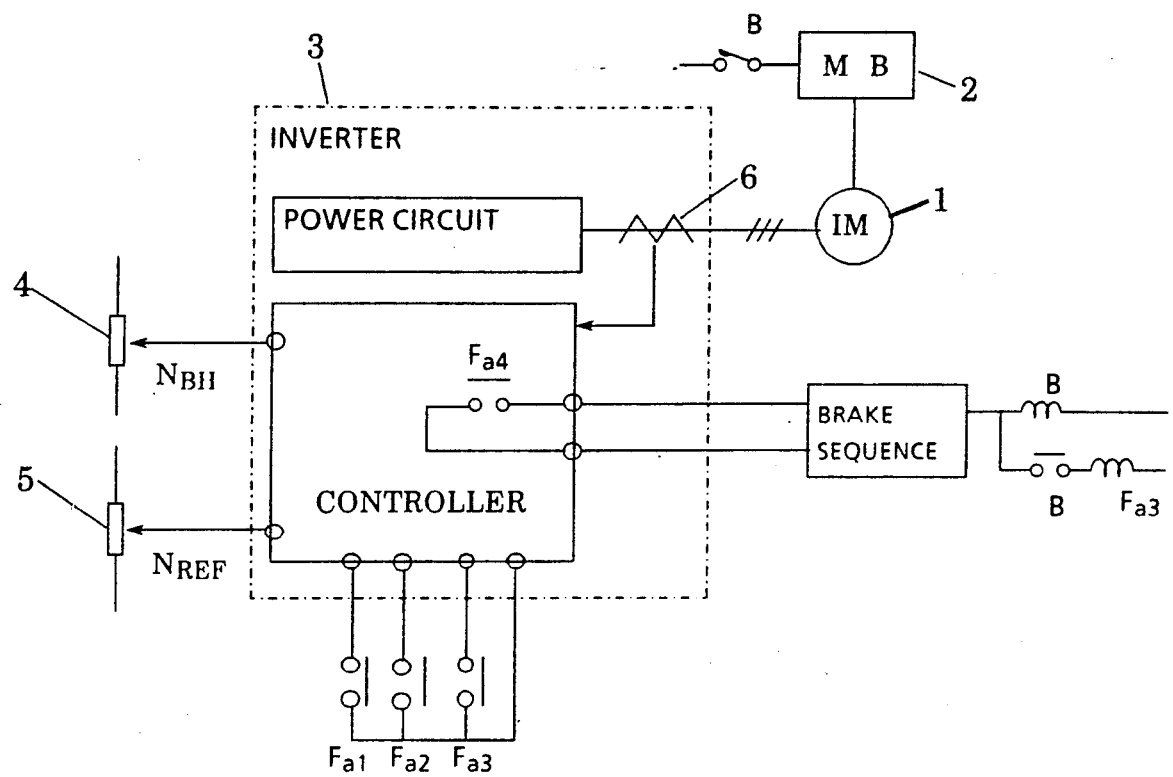
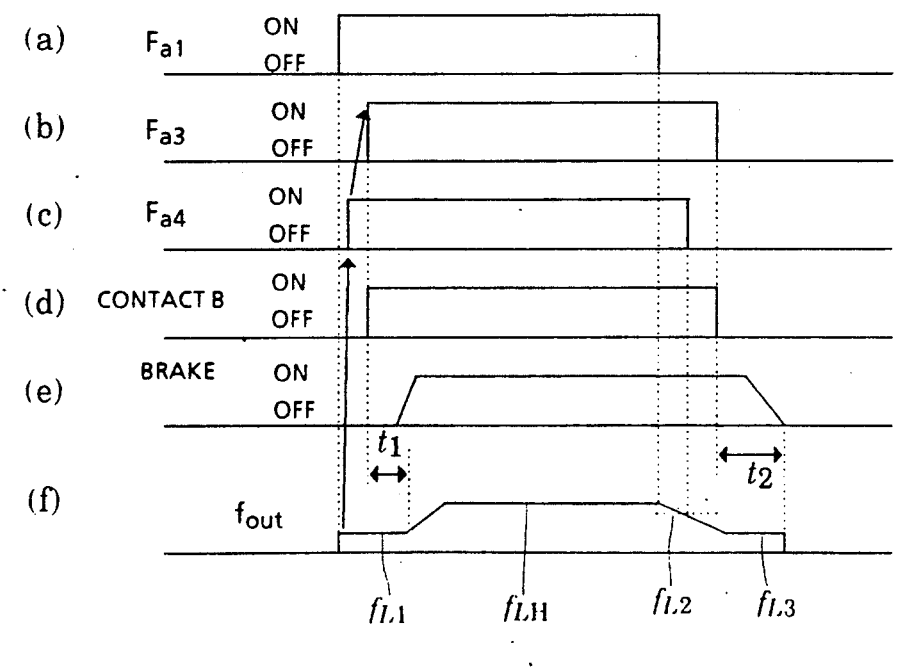

METHOD OF CONTROLLING V/F INVERTER FOR MACHINES HAVING MECHANICAL BRAKING SYSTEMS

This application is a continuation of application Ser. No. 034,827, filed Apr. 6, 1987, now abandoned.

FIELD OF THE INVENTION

The present invention relates to a method of controlling a V/F (voltage to frequency ratio controlled) inverter used for controlling a machine such as a crane having one or more mechanical brakes, by the use of an open-loop system.

BACKGROUND OF THE INVENTION

Heretofore, cranes have been driven by DC motors. Using induction motors instead of the DC motors has been discussed, because induction motors are stout, easy to maintain, and inexpensive. When such an induction motor is employed, a slip-frequency control operation or vector control operation is performed to obtain characteristics comparable with the characteristics of a DC motor which are easy to control. In this case, the primary current and the slip frequency of the induction motor are controlled. Thus, it is possible to obtain characteristics comparable with the characteristics of a DC motor, including accuracy with which the torque is controlled and response.

When the vector control operation is performed, it is necessary to detect the slip frequency.

It has been customary to use a tachometer generator or pulse generator to detect the slip frequency. Today, investigations are conducted to simplify the structure and reduce the cost by arithmetically finding the slip frequency without using any of such detectors.

One method of driving an induction motor makes use of a inverter. This method is now described in detail by referring to FIG. 5. A main circuit is formed by a DC power supply 10, a smoothing capacitor 11, power transistors 12-17, and diodes 18-23. The voltage, current, and frequency applied to an induction motor 1 are controlled by turning on and off the power transistors 12-17. In this way, the velocity of the motor is controlled. A signal-processing circuit 24 that constitutes an inverter control circuit calculates the frequency and the voltage to be applied to the motor 1 in response to a velocity reference $N_{REF}$. Then, the circuit 24 determines the pulse duration and the pulse repetition frequency to maintain the ratio of the voltage to the frequency constant. Where the motor is a three-phase induction motor, the signal-processing circuit 24 delivers a three-phase PWM (pulse width modulation) signal 25.

A base driver circuit 26 has a pulse transformer or photo-coupler for isolating the main circuit power supply from the control power supply. The driver circuit 26 further includes an overcurrent-detecting circuit for detecting overcurrents flowing into the power transistors. The base driver circuit 26 produces a base driver signal 27 for the power transistors 12-17 of the main circuit from the modulated signal 25. Indicated by numeral 28 is a protective circuit for the base driver circuit 26.

There exists an open-loop system in which a signal indicative of the speed of a motor is not fed back to the input, for controlling a V/F inverter. This system does not use a speed detector such as a tachometer generator, in order to curtail the cost.

When such an open-loop system for controlling a V/F inverter is employed to control the operation of a crane, when the crane is started, the velocity of the load does not increase because of a lag in the operation of the mechanical brake, but there arises the possibility that the load is dropped since the output frequency of the inverter increases. Also, when the crane is stopped, the load might slide down because the mechanical brake is not immediately actuated.

For these reasons, the common practice is to use a speed detector, such as a pulse generator, and an V/F inverter for controlling the slip frequency or the stator current vector of an induction motor.

SUMMARY OF THE INVENTION

Accordingly, it is an object of the present invention to provide a method of controlling a V/F inverter that is used for a crane without detecting the speed of an electric motor that drives the crane and without creating the possibility that the load drops or slides down due to a delay in the response of the mechanical brake when the crane is started or stopped.

When the crane is going to be started, a starting torque sufficient to hold the load is produced until the mechanical brake is completely released. More specifically, a signal of a low frequency is applied to the motor, the low frequency being lower than the lowest possible frequency to maintain the crane in operation. The term "the lowest possible frequency" means a frequency which corresponds to the lowest velocity of the crane, and the term "the low frequency being lower than the lowest possible frequency" means a frequency which is lower than the lowest possible frequency to maintain said machine in operation and at which a torque sufficient to hold the load is obtained. When it is found that the output current from the inverter exceeds a predetermined level, an instruction is given to the mechanical brake to release it. Then, the output frequency of the inverter is maintained at said low frequency until a certain period elapses to permit the brake to be completely released. This can prevent the load from dropping when the crane is started.

When the crane is going to be stopped, the torque sufficient to hold the load is produced until the mechanical brake is actuated completely. More specifically, the instruction for releasing the mechanical brake is not produced and, at the same time, the output frequency and the voltage are reduced until a low frequency is reached which is lower than the aforementioned lowest possible frequency and at which a torque sufficient to hold the load is produced. The output of a frequency exceeding the low frequency is caused to persist either until a certain period elapses to permit the brake to be completely applied or until the output current from the inverter exceeds a predetermined level. This can prevent the load from sliding down when the crane is stopped.

Consequently, the crane can be controlled by the novel method without presenting the foregoing problems with the prior art techniques.

Other objects and features of the invention will appear in the course of the description thereof which follows.

BRIEF DESCRIPTION OF THE DRAWING

FIG. 1 is a circuit diagram of a crane-driving device which is operated by a method according to the invention;

FIG. 2 is a time chart for illustrating the operation of the device shown in FIG. 1;

DETAILED DESCRIPTION OF THE INVENTION

Figure 3:
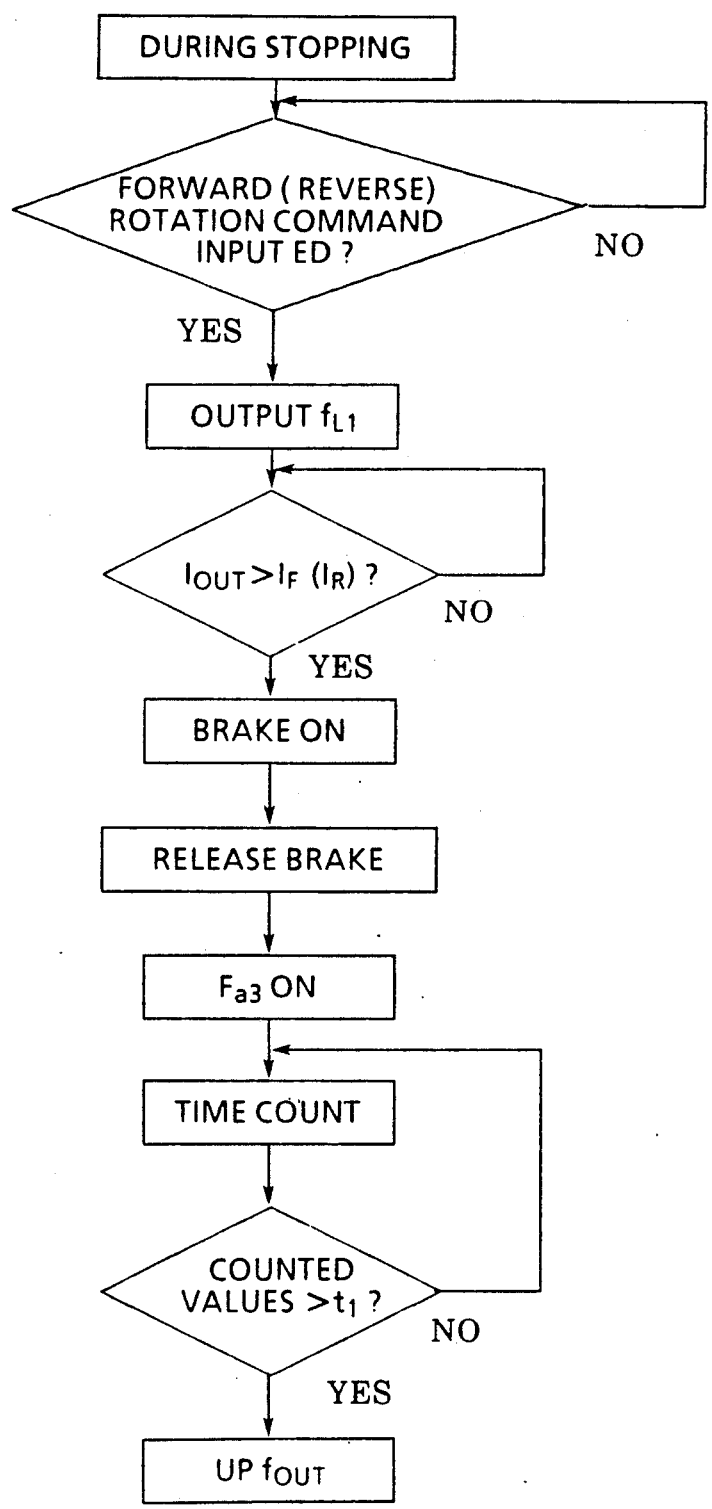
FIG. 3 is a flow chart showing the operation of the inverter 3 at starting.

Referring to FIG. 1, there is shown a device for driving a crane by a method according to the invention. This device has an induction motor 1, a mechanical brake 2, a V/F inverter 3 that is controlled by an open-loop system, a brake rate-setting device 4 for setting the rate at which the brake 2 is hold, a velocity-setting device 5, a current transformer 6 for detecting the output current from the inverter 3, and normally open contacts $F_{a1}$, $F_{a2}$, $F_{a3}$, $F_{a4}$. It is well known that, in a voltage-to-frequency converter of the type used with the present invention, the ratio of voltage to frequency is maintained constant.

The contact $F_{a1}$ is used to order a forward rotation. The contact $F_{a2}$ is used to order a reverse rotation. The contact $F_{a3}$ is an auxiliary relay contact for a main circuit contactor B which is used for the brake 2. The contact $F_{a4}$ is used to order energization of the mechanical brake. In this specific example, the inverter 3 is a digital inverter incorporating a microprocessor.

The crane is started in the manner described below and FIG. 3. When the crane (not shown) is started, either the contact $F_{a1}$ for a forward rotation or the contact $F_{a2}$ for a rearward rotation is closed. Then, the inverter 3 delivers a low frequency $f_{L1}$ shown in FIG. 2 (f). This frequency $f_{L1}$ is lower than the lowest possible frequency that permits the crane to be maintained in operation. The motor 1 produces a torque sufficient to hold the load while fixed by the mechanical brake 2. Under this condition, if the output current from the inverter 3 exceeds a predetermined level, then the current transformer 6 closes the contact $F_{a4}$ for ordering energization of the solenoid brake. Accordingly, the main circuit contactor B is energized to close the auxiliary relay contact $F_{a3}$. At the same time, the brake 2 begins to be released. The output frequency $f_{out}$ of the inverter 3 is increased from the low frequency $f_{L1}$ to a frequency $f_{LH}$ corresponding to the velocity set by the velocity-setting device 5, by means of a linear change instruction device (not shown). This operation for increasing the frequency is initiated after a certain period t1 elapses to ensure complete release of the brake since the auxiliary relay contact $F_{a3}$ is closed, as shown in FIG. 2 (f). Thereafter, the operation of the crane is maintained.

Figure 4:
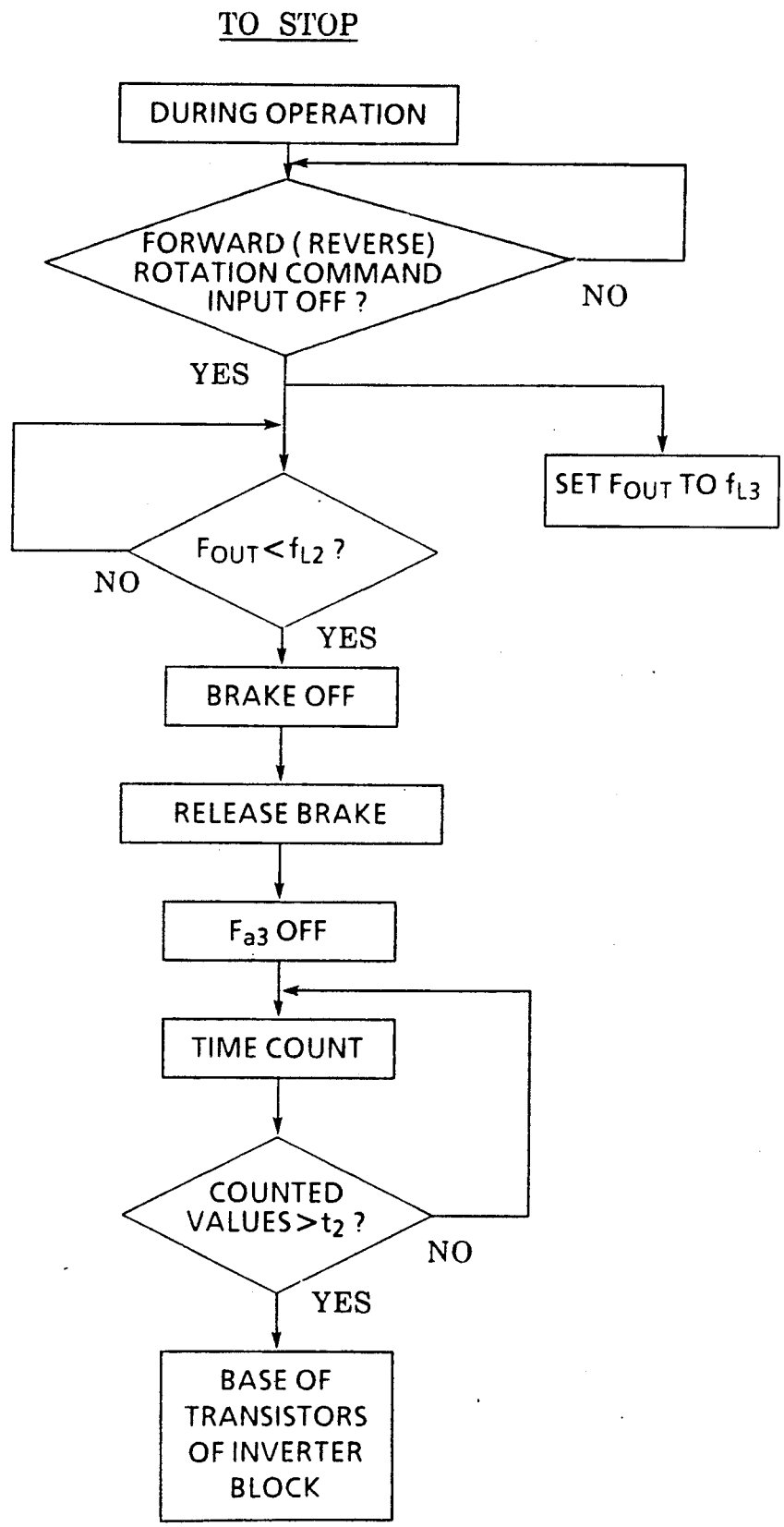
FIG. 4 is a flow chart showing the operation of the inverter 3 at stopping.
Figure 5:
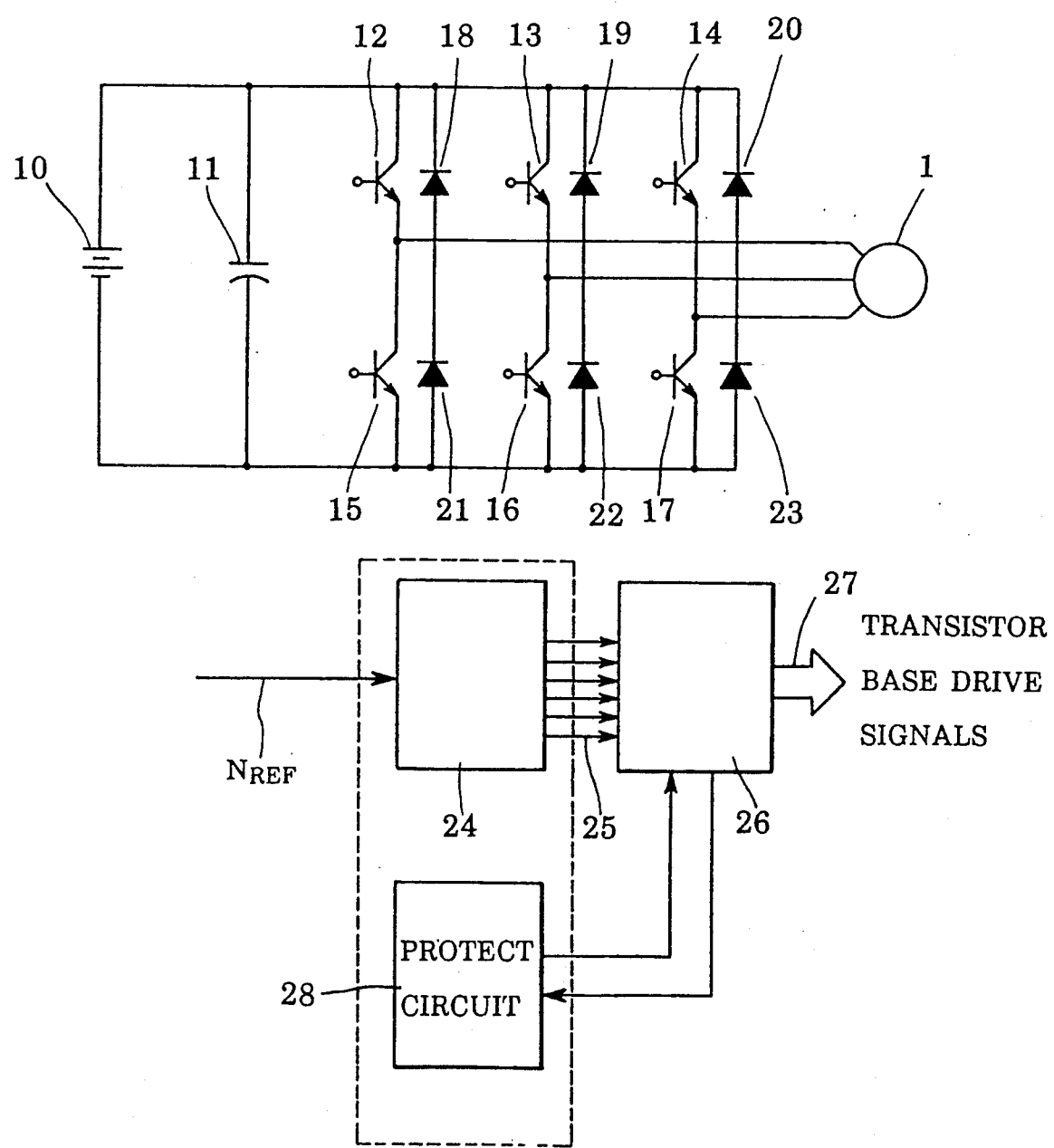
FIG. 5 is a circuit diagram of a conventional device which uses a inverter to control an induction motor.

The crane is stopped in the manner described below and FIG. 4. When the crane is in operation, if the contact $F_{a1}$ for ordering a forward rotation is opened, the output frequency of the inverter 3 is reduced down to the low frequency $f_{L1}$ by the linear change instruction device. During this process, if the output frequency decreases below a frequency $f_{L2}$ corresponding to the velocity set by the brake rate-setting device 4, then the contact $F_{a4}$ for ordering energization of the brake is opened, as shown in FIG. 2, (f) and (c). As a result, the main circuit contactor B is deenergized, opening the auxiliary relay contact $F_{a3}$, as shown in FIG. 2 (b). At the same time, actuation of the brake 2 is started. The inverter 3 delivers a frequency $f_{L3}$ not less than the low frequency $f_{L1}$ from the instant at which the contact $F_{a3}$ is opened, until a certain period t2 elapses to allow the motor 1 to be checked. Subsequently, the inverter 3 ceases to produce the output signal.

The inverter controller constantly monitors the operation to detect any trouble. When any one of the following trouble signals is detected the brake system is automatically actuated.

1) When the reverse rotation command signal $F_{a2}$ is sent when the motor is actually in forward rotation command signal $F_{a1}$ or the reverse.

2) when the forward rotation command signal $F_{a1}$ or the reverse rotation command signal $F_{a2}$ is sent and the signal $F_{a3}$ does not turn on within one second.

3) When signal $F_{a4}$ goes off and signal $F_{a3}$ does not even after 0.3 seconds have elapsed.

As described above, in accordance with the invention, when the crane is started, the generation of the starting torque needed to hold the load is maintained until the mechanical brake is completely released. After the release is ascertained, the output frequency of the inverter is varied to a given operating frequency. When the crane is stopped, the low frequency for producing the torque needed to hold the load is not supplied to the inverter during the interval between the instant at which the order for releasing the brake is terminated and the instant at which the brake is actuated fully.

Therefore the load is prevented from dropping when the crane is started and prevented from sliding down when the crane stopped. This undesirable dropping or sliding normally occurs because of a lag or delay in the operation of a mechanical brake. The crane can be controlled by the V/F inverter using open-loop control. Hence, the inverter can be made simple in structure and fabricated inexpensively.

What is claimed is:

1. A method for controlling a constant V/F inverter that controls an induction motor by the use of an open-loop system wherein a quantity corresponding to the speed of the motor is not employed as a control function, the induction motor being braked by a mechanical brake, said method comprising the steps of:

controlling said induction motor to produce a starting torque which is sufficient to hold the load stationary when the machine is started and which is insufficient to move said load, said step of controlling including the step of controlling said inverter to supply a low non-zero output frequency to the induction motor which is lower than the lowest possible frequency necessary for the induction motor to drive said machine to move said load;

subsequently detecting whether an output current from the inverter is in excess of a predetermined level;

subsequently applying a release signal to the mechanical brake to release said brake when said output current from said inverter has been detected in excess of said predetermined level; and maintaining the output frequency at said low frequency for a predetermined time following the time at which the brake is released;

said method further comprising the steps of:

stopping movement of the load by the machine, including the steps of:

terminating a mechanical brake releasing signal supplied to said mechanical brake before the output frequency of said inverter reaches a low non-zero frequency which is lower than the lowest possible output frequency which is necessary for the induction motor to drive said machine to move said load and at which a torque sufficient to hold the load stationary is produced; and subsequently maintaining the output of the inverter at a frequency not less than said low frequency until the output current from the inverter exceeds a predetermined level.

* * * * *